United States Patent

Ahn

[11] Patent Number: 5,907,454
[45] Date of Patent: May 25, 1999

[54] TECHNIQUE FOR PREVENTING DEW FROM FORMING ON INTERNAL COMPONENTS OF HARD DISK DRIVE

[75] Inventor: Young-Sub Ahn, Suwon, Rep. of Korea

[73] Assignee: SamSung Electronics Co., Ltd., Suwon, Rep. of Korea

[21] Appl. No.: 08/857,067

[22] Filed: May 15, 1997

[30] Foreign Application Priority Data

May 15, 1996 [KR] Rep. of Korea ............ 16274/96

[51] Int. Cl.$^6$ .................................................. G11B 33/14
[52] U.S. Cl. ............................................. 360/97.03
[58] Field of Search .................. 360/97.01, 97.02, 360/97.03, 97.04, 102, 103, 133, 135, 137

[56] References Cited

U.S. PATENT DOCUMENTS

| | | |
|---|---|---|
| H1067 | 6/1992 | Eckerd . |
| Re. 34,497 | 1/1994 | Blanks . |
| 3,955,176 | 5/1976 | Andersson ........................ 357/81 |
| 4,642,715 | 2/1987 | Ende ................................ 360/97 |
| 4,751,594 | 6/1988 | Blanks . |
| 4,863,499 | 9/1989 | Osendorf . |
| 4,967,295 | 10/1990 | Yamauchi et al. ............ 360/97.02 |
| 5,012,360 | 4/1991 | Yamauchi et al. . |
| 5,030,260 | 7/1991 | Beck et al. . |
| 5,057,951 | 10/1991 | Eckerd . |
| 5,075,807 | 12/1991 | Inoue et al. . |
| 5,229,899 | 7/1993 | Brown et al. . |
| 5,293,286 | 3/1994 | Hasegawa et al. . |
| 5,406,431 | 4/1995 | Beecroft . |
| 5,417,743 | 5/1995 | Dauber . |
| 5,590,001 | 12/1996 | Ino et al. . |
| 5,650,890 | 7/1997 | Kuroki et al. ................ 360/97.02 |
| 5,734,521 | 3/1998 | Fukudome et al. ............ 360/97.03 |

*Primary Examiner*—Robert S. Tupper
*Assistant Examiner*—Angel Castro
*Attorney, Agent, or Firm*—Robert E. Bushnell, Esq.

[57] ABSTRACT

A hard disk drive, which includes a main body with a cover for protecting its internal parts, includes at least one dew forming plate with a thermal conductivity greater than that of the cover, the at least one dew forming plate being mounted in a respective opening of the cover so as to collect the dew that would be formed on the internal parts due to the external environment.

17 Claims, 6 Drawing Sheets

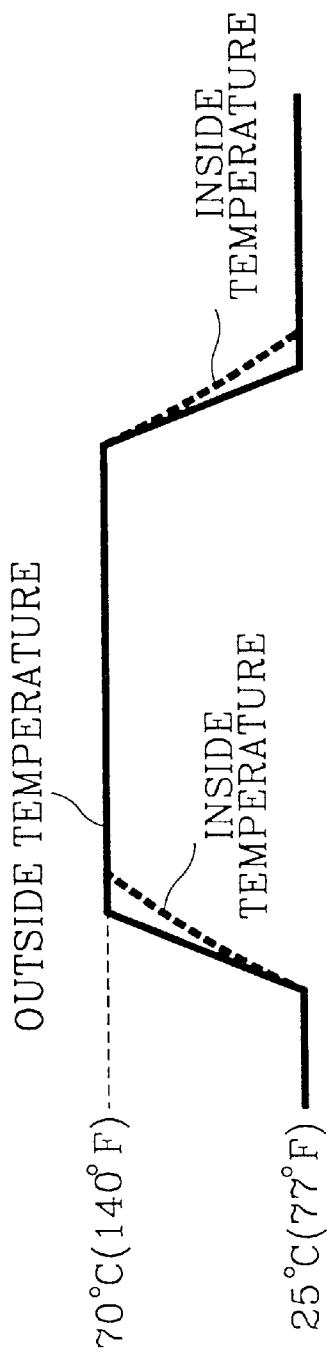
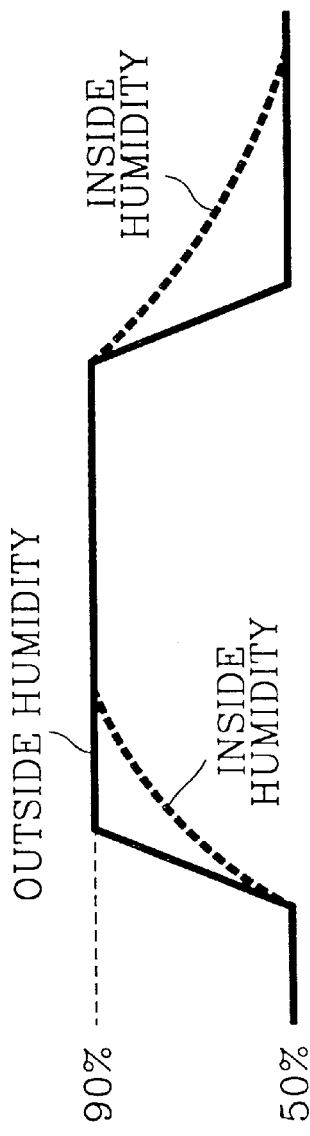

ered. As the air passes out of or into the inside of the hard disk drive, the humidity of the inside is adjusted# TECHNIQUE FOR PREVENTING DEW FROM FORMING ON INTERNAL COMPONENTS OF HARD DISK DRIVE

CLAIM OF PRIORITY

This application makes reference to, incorporates the same herein, and claims all benefits accruing under 35 U.S.C. § 119 from an application for HARD DISK DRIVE FOR PREVENTING DEW FROM BEING FORMED ON ITS INTERNAL COMPONENTS AND METHOD THEREFOR earlier filed in the Korean Industrial Property Office on the day of May 15, 1996 and there duly assigned Ser. No. 16274/1996, a copy of which application is annexed hereto.

BACKGROUND OF THE INVENTION

1. Field of the Invention

The present invention relates to a disk drive, and more particularly to a technique for preventing dew from forming on internal components of a hard disk drive.

2. Description of the Related Art

The moisture existing on the inside of a hard disk drive exerts a bad influence upon inside components. Especially dew formed in a state of saturation exerts bad effects upon an operation of components. Therefore, it is necessary to prevent dew from being formed inside when manufacturing a hard disk drive. There are normally two techniques to prevent dew from being formed on the inside of a hard disk drive. One technique is to seal the inside of a hard disk drive by using a gasket or a tape. The sealing material of the gasket or tape cutting off the inside of a hard disk drive from the outside has the property of preventing dew from penetrating thereinto, but the cost for preventing dew becomes expensive. Another technique is to use a breather filter. The breather filter is installed on the upper surface of a cover of a main body and it is widely used more than sealing. The breather filter is used for the following reasons.

By a high speed rotation of the hard disk, an air flow is generated on the inside of a hard disk drive and accordingly, a distribution of air pressure occurs. The pressure at the moment is lower than that of the outside of the hard disk drive and accordingly the contaminated outside air flows into the inside of the hard disk drive, resulting in contamination of the inside. An inlet opening is installed for air flow and is formed between the outside to the inside and the breather filter is installed in the opening for allowing clean air to flow in. The inlet opening equipped with a breather filter is used as a vent when the hard disk drive is not operated. As the air passes out of or into the inside of the hard disk drive, the humidity of the inside is adjusted somewhat. Accordingly, the dew formed in a state of saturation is also somewhat prevented. It is understood that a response of an inside temperature according to an outside temperature is faster than that of an inside humidity according to an outside humidity.

When a hard disk drive using the breather filter is moved from a state of a high temperature and high humidity to a reversed state, dew is formed inside due to the temperature and humidity cycle. When a hard disk drive at a warehouse having a high temperature and humidity is moved to an office having a low temperature and low humidity, dew can be formed on the internal parts of the hard disk drive. The dew exerts bad effects upon inside components of the hard disk drive such as the head and the recording medium.

The following patents each disclose features in common with the present invention but do not teach or suggest a technique for preventing dew from forming on internal components of a hard disk drive utilizing a dew forming plate having a thermal conductivity greater than that of the cover of the hard disk drive as in the present invention.

U. S. Pat. No. 5,590,001 to Ino et al., entitled Breather Filter Unit For Magnetic Disk Drive, U.S. Pat. No. 5,417,743 to Dauber, entitled Self-Adhesive Vent Filter And Adsorbent Assembly With A Diffusion Tube, U. S. Pat. No. 5,293,286 to Hasegawa et al., entitled Magnetic Disk Apparatus For Maintaining An Optimum Humidity In A Head Disk Assembly, U.S. Pat. No. 5,075,807 to Inoue et al., entitled Magnetic Disk Device Including Humidity Controller In Disk Enclosure, U.S. Pat. No. 5,229,899 to Brown et al., entitled Apparatus And Method For Controlling Vapor Phase Within An Enclosure, U.S. Pat. No. 5,057,951 to Eckerd, entitled Breather Vent Assembly Formed In A Sealed Disk Drive Housing, U.S. Pat. No. 5,406,431 to Beecroft, entitled Filter System For Type II HDD, U.S. Pat. No. 5,012,360 to Yamauchi et al., entitled Defumidifier For Magnetic Disk Apparatus, U.S. Pat. No. 5,030,260 to Beck et al., entitled Disk Drive Breather Filter, U.S. Pat. No. 4,967,295 to Yamauchi et al., entitled Humidity Regulating Apparatus For Magnetic Disk Drive, U.S. Pat. No. 4,751,594 to Blanks, entitled Low Diffusion Disk Drive Breather Vent, U.S. Pat. No. 4,863,499 to Osendorf, entitled Anti-Diffusion Chemical Breather Assembly For Disk Drives, U.S. Pat. No. Re. 64,497, to Blanks, entitled Low Diffusion Disk Drive Breather Vent, and U.S. Pat. No. H1067 to Eckerd, entitled Breather Vent Assembly Formed In A Sealed Disk Drive Housing.

SUMMARY OF THE INVENTION

It is an object of the present invention to provide a technique for preventing dew from being formed on the internal parts of a hard disk drive.

It is another object of the present invention to provide a technique for adjusting the humidity inside a hard disk drive.

According to the present invention, a hard disk drive, having a main body with a cover for protecting its internal parts, comprises: a dew forming plate with a thermal conductivity greater than that of the cover, the dew forming plate being mounted on an opening of the cover so as to collect the dew which would be formed on the internal parts due to the external environment.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 1A and 1B illustrate a temperature cycle and a humidity cycle of a disk drive using a breather filter;

DETAILED DESCRIPTION OF THE PREFERRED EMBODIMENT

FIGS. 1A and 1B are graphs illustrating a temperature cycle and a humidity cycle of a disk drive using a breather filter. Referring to FIG. 1A, a solid line illustrates a temperature given from the outside of a hard disk drive and a dotted line illustrates a relative temperature of the inside of a hard disk drive affected by the outside temperature. Referring to FIG. 1B, a solid line illustrates a humidity from the outside and a dotted line illustrates a relative humidity of the inside of a hard disk drive affected by the outside humidity. It is noted that the temperature and relative humidity are experimental values in FIGS. 1A and 1B.

Referring to FIGS. 1A and 1B, it is understood that a response of an inside temperature according to an outside temperature is faster than that of an inside humidity according to an outside humidity.

When a hard disk drive using the breather filter is moved from a state of a high temperature and high humidity to a reversed state, dew is formed inside because of a feature of said temperature and humidity cycle. An example of moving a hard disk drive from a state of high temperature and high humidity to a reversed state is illustrated in FIG. 2.

Figure 2:
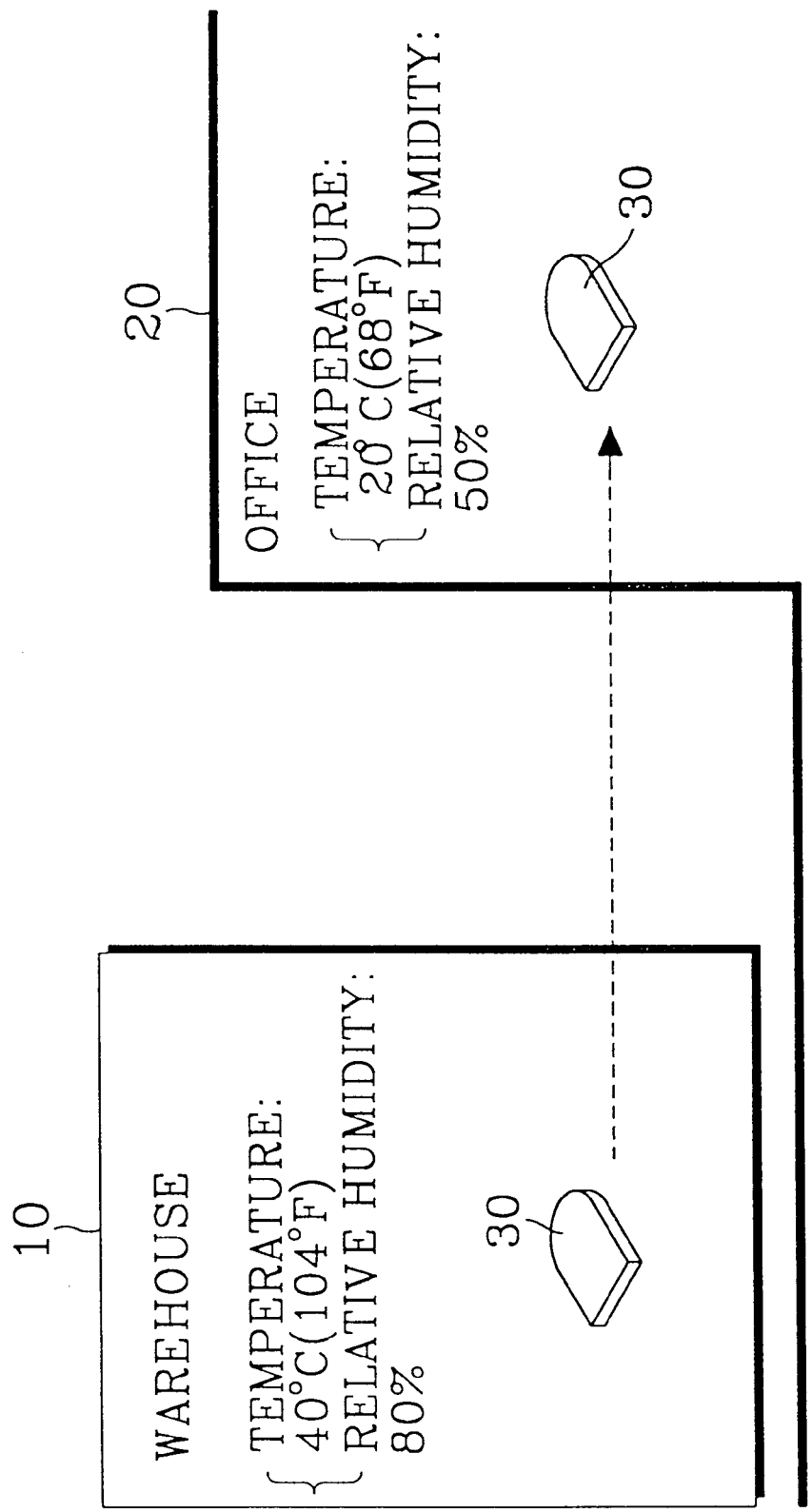
FIG. 2 illustrates an example of a hard disk drive being moved from a state of a high temperature and humidity to a low temperature and humidity.
Figure 3A:
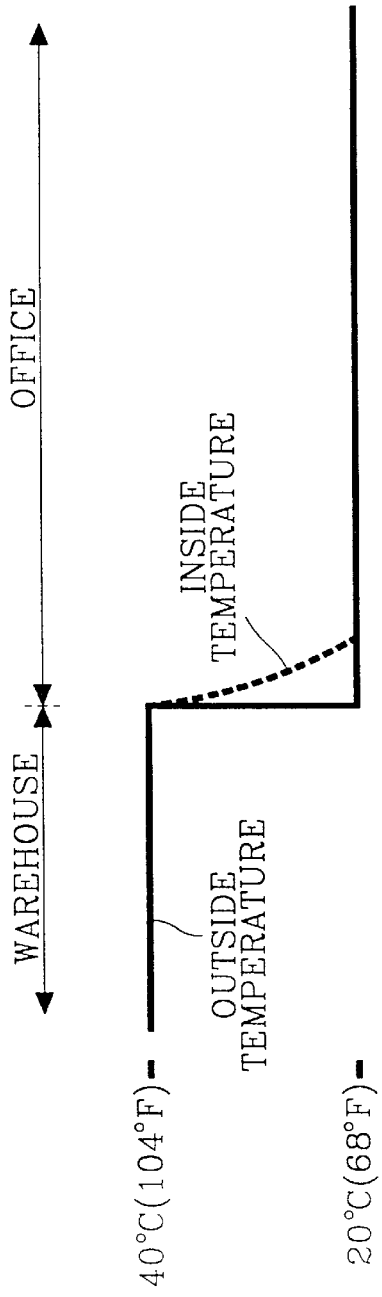
FIGS. 3A and 3B are graphs illustrating a temperature cycle and a humidity cycle for describing dew forming inside in the case of FIG. 2.
Figure 3B:
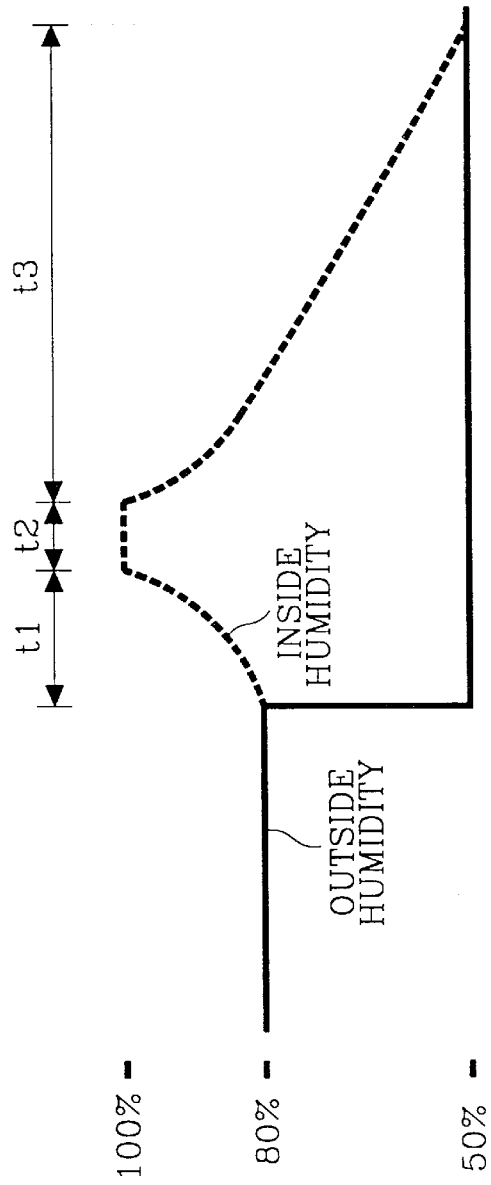
Figure 4:
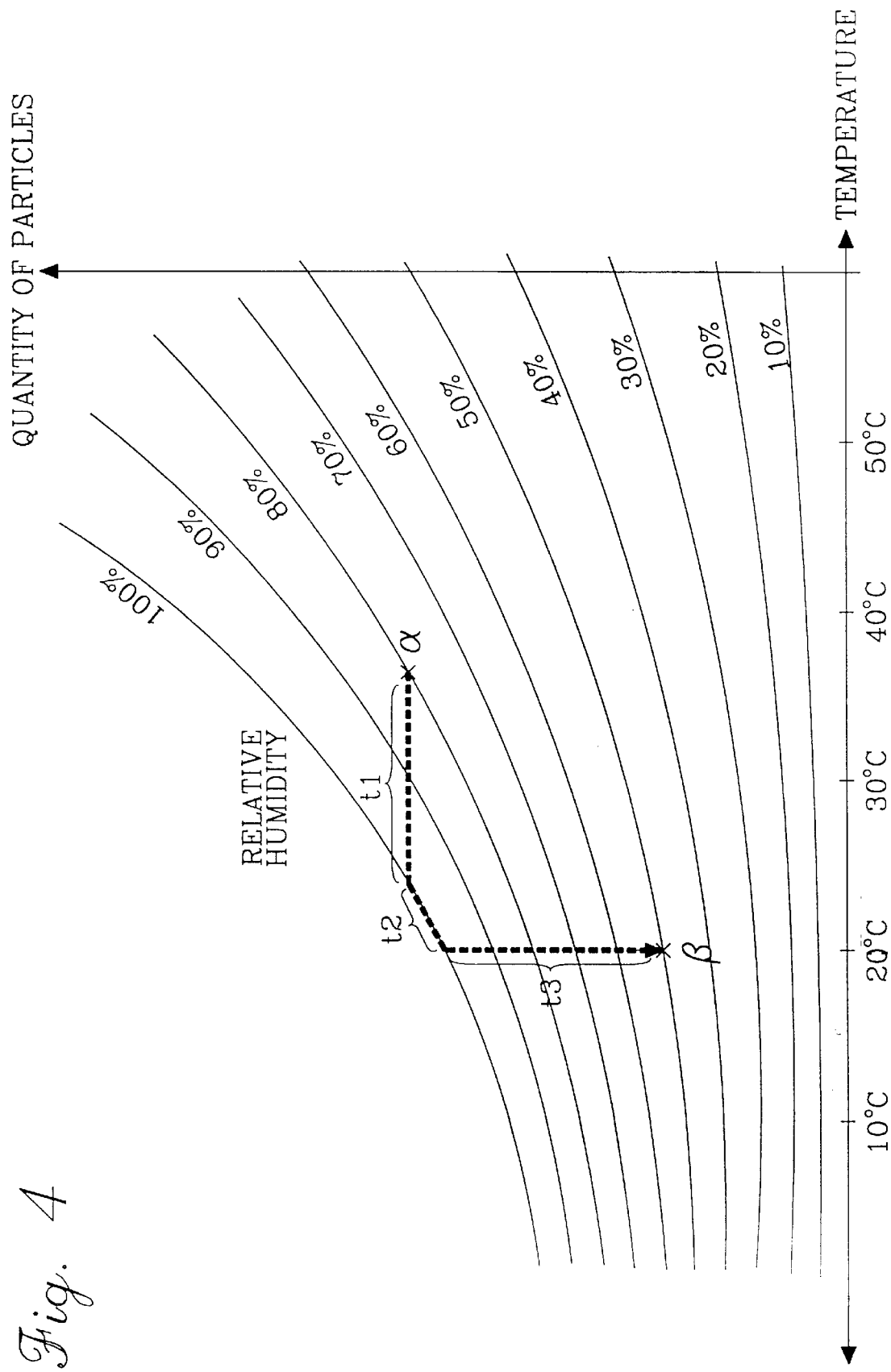
FIG. 4 is a graph illustrating a relationship between a temperature and a relative humidity according to a quantity of particles.

Referring to FIG. 2, a warehouse 10 storing computer equipped with a hard disk drive 30 has an environment of a temperature of 40° C. (104° F.) and a relative humidity of 80%, and accordingly an inside of the hard disk drive 30 gets to a temperature of 40° C. (104° F.) and a humidity of 80% according to the temperature and humidity cycle illustrated in FIGS. 1A and 1B. On the other hand, an office 20 keeps an environment of a temperature of 20° C. (68° F.) and a relative humidity of 50%. With these environments, dew is formed inside a hard disk drive 30 when moving a hard disk drive 30 from the warehouse 10 to the office 20. The reasons for forming dew inside a hard disk drive are illustrated in FIGS. 3A, 3B and 4. FIG. 3A illustrates a temperature cycle and FIG. 3B shows a humidity cycle, and FIG. 4 illustrates a specific character of temperature and relative humidity according to a quantity of particles.

When a hard disk drive 30 at a warehouse 10 having a temperature of 40° C. and a relative humidity of 80% is moved to an office 20 having a temperature of 20° C. (68° F.) and a humidity of 50%, an inside temperature and humidity of a hard disk drive 30 are changed as illustrated in FIGS. 3A and 3B respectively. A change of inside humidity of a hard disk drive 30 in FIG. 3B is progressed differently from that of the hard disk drive in FIG. 1B.

Referring to FIG. 3B, an inside humidity of a hard disk drive moved to an office 20 is increased gradually in a section t1 and saturated in a section t2, and decreased gradually in a section t3. The change of said inside humidity as illustrated in FIG. 3B is attributed to a hard disk drive having two properties as follows. One is that the thermal conductivity from an outside to an inside is fast and vice versa. The other is that the humidity inflow from an outside to an inside is slow and vise versa.

Referring to FIG. 4, the point α shows an inside temperature, a relative humidity and quantity of particles of a hard disk drive 30 at the moment when it moves to an office 20. At the point α, the inside temperature of a hard disk drive becomes the same as a temperature of 20° C. of an office just after a while. But the quantity of particles inside the hard disk drive 30 is not changed for the time. In other words, the inside moisture does not flow out easily. Accordingly the relative humidity is increased gradually resulting in a state of saturation(100%). The saturation of the relative humidity means that dew is formed on the inside and the saturation will be maintained during the quantity of particles being decreased to some extent. The quantity of particles is decreased further, resulting in the relative humidity being decreased gradually. After arriving at the relative humidity(50%) of an office 20, it maintains the relative humidity of an office. The point β in FIG. 4 shows an inside temperature and relative humidity of a hard disk drive 30 balanced with a temperature of 20° C. (68° F.) and a relative humidity of 50% of an office 20. As described above, the hard disk drive using a breather forms dew inside when being moved from a state of high temperature and humidity to a state of low temperature and humidity. The dew exerts bad effects upon an inside components such as a head and a recording medium.

Dew is formed inside a hard disk drive using a breather filter in the case of being moved from a state of a high temperature and humidity to that of a low temperature and humidity, resulting in inner parts such as a head and a recording medium being affected badly. Dew forms directly on inner parts. According to the present invention, dew is controlled so as to be only formed on a restricted place of a cover, such as a dew forming plate. An opening is made on the cover for installing a dew forming plate.

Figure 5:
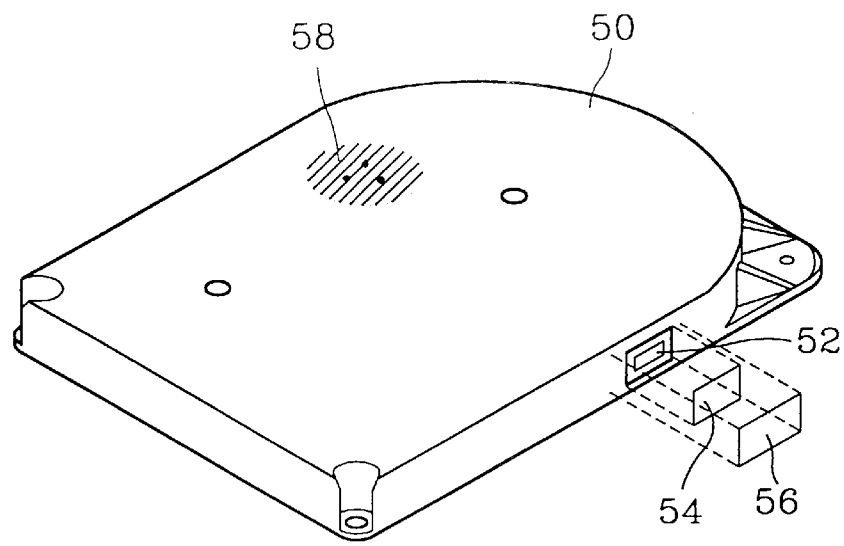
FIG. 5 illustrates a location of a dew forming plate according to the present invention.

Referring to FIG. 5, there is an opening 52 on a cover 50 of a hard disk drive. The opening 52 is for receiving a servo write head and is called a 'window clock" generally. After receiving a servo write head, a plate 54 is attached to the opening 52 and sealed by a label 56 for preventing dew. Normally, the plate 54 is made of aluminum as is the cover 50. A breather filter 58 is also disposed on the cover 50.

According to the present invention, a dew forming plate is installed on the opening 52 for collecting dew inside the hard disk drive main body, its thermal conductivity being greater than that of the cover and its thickness being less than that of the cover 50. The cover is made of aluminum and the dew forming plate is made of copper.

Figure 6:
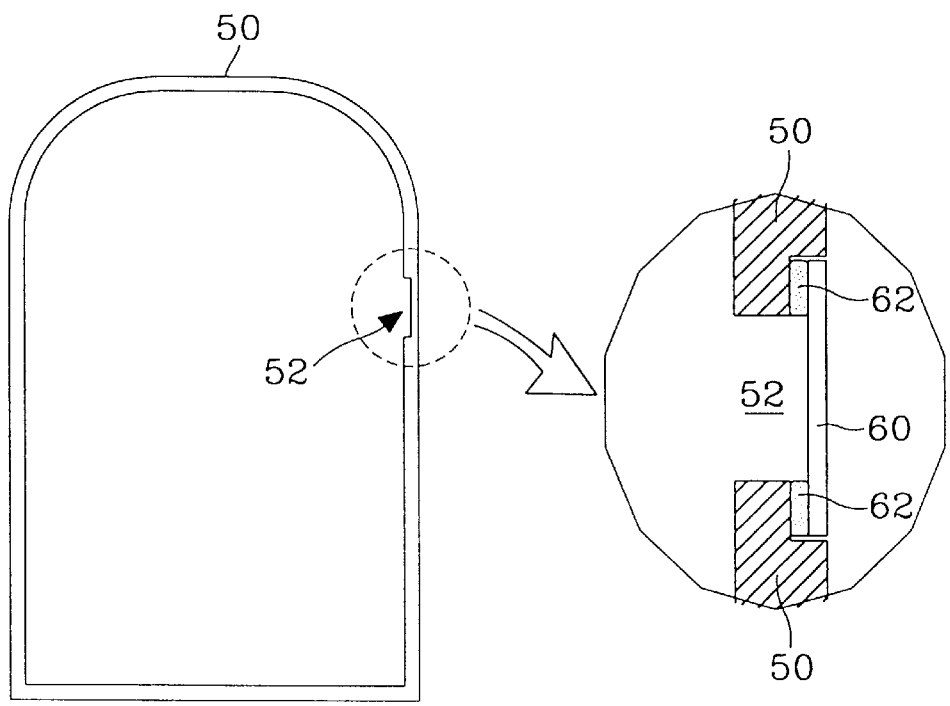
FIG. 6 illustrates a dew forming plate being installed on an opening of a cover in details.

Referring to FIG. 6, a dew forming plate 60(copper plate) is installed on the opening 52 of the cover 50 by adhesives 62 having good thermal conductivity. It is desirable to fix a sealing label on the dew forming plate 60. According to the present invention, a plurality of openings may be made for installing a plurality of dew forming plates.

Figure 7A:
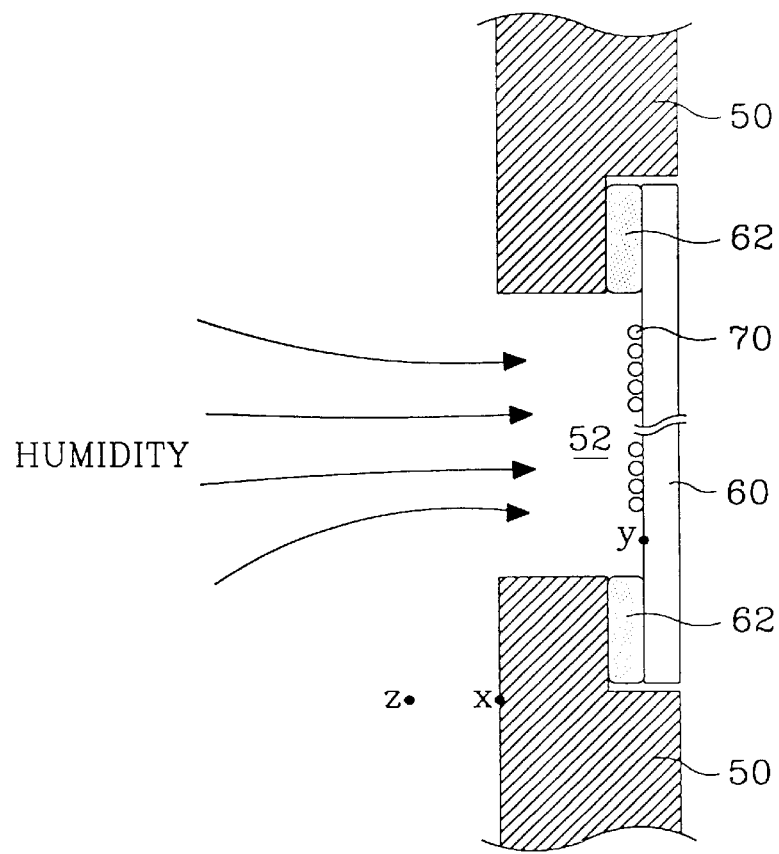
FIG. 7A illustrates the forming of dew on a dew forming plate.
Figure 7B:
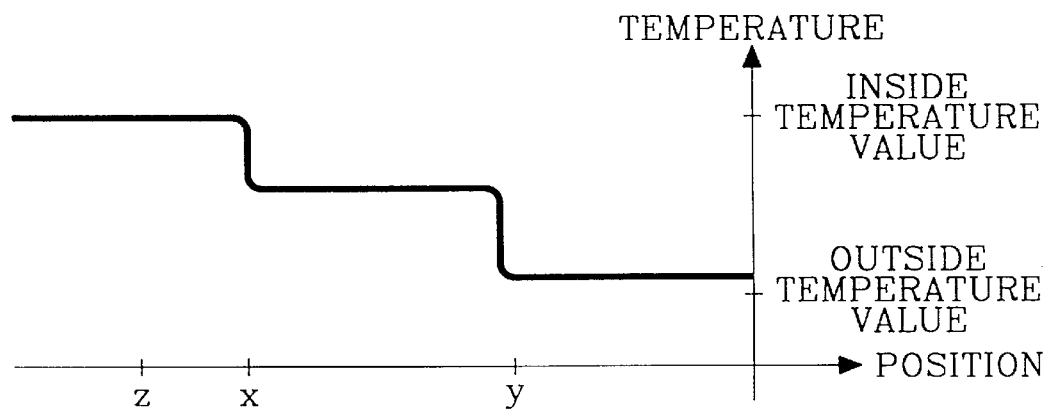
FIG. 7B is a graph illustrating a temperature state around a cover equipped with a dew forming plate.

Referring to FIGS. 6, 7A and 7B, the formation of dew on a dew forming plate in FIG. 7A and a temperature state around the dew forming plate 60 of the cover 50 in FIG. 7B is shown. Dew is formed inside a hard disk drive when being moved from a state of a high temperature and humidity to that of a low temperature and humidity. The temperature of the dew forming plate is balanced with an outside temperature quickly in this case. A temperature of specific point x inside the cover 50 near an opening 52 is the same as that of an inner point of the hard disk drive, resulting in it being at a high temperature. But the temperature of specific point y of inner surface of dew forming plate 60 is same as that of the outside of the hard disk drive, resulting in it being at a low temperature.

Referring to FIG. 3B, the internal humidity is increased gradually in a section t1 and becomes saturated in a section t2. While the inner humidity is going up to a saturation point, the inner moisture is collected only on the dew forming plate 60 which is kept at a low temperature. In this environment, the inner humidity goes up continuously, resulting in a saturation state. Then dew 70 is formed only on the dew forming plate. While dew being formed on the dew forming plate is maintained for the time being, the moisture of a hard disk drive goes out of the inside through the breather filter 58 gradually and an inside humidity is decreased gradually as illustrated in a section t3 of FIG. 3B. As the inner humidity of a hard disk drive becomes lower gradually in a section t3, dew formed on the dew forming plate begins to evaporate. Accordingly, dew is not formed on inner components of the hard disc drive. In any case of an environment change resulting in forming of dew inside a hard disc drive, the present invention can be applied.

Accordingly, the present invention prevents dew from being formed on the internal parts of a hard disc drive due to an outside environment change by installing a dew forming plate on an opening of the cover, thereby preventing the internal parts from being damaged.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A hard disk drive, having a main body with a cover for protecting its internal parts, comprising: at least one dew forming plate having a thermal conductivity greater than that of the cover, said at least one dew forming plate being mounted in a respective through opening of the cover so as to collect dew which would be formed on said internal parts due to an external environment, and further comprising a permeable sealing label attached over each of said at least one dew forming plate.

2. A hard disk drive as defined in claim 1, said at least one dew forming plate comprising a copper plate.

3. A hard disk drive as defined in claim 1, said at least one dew forming plate having a thickness which is less than that of the cover.

4. A hard disk drive as defined in claim 1, each opening of the cover comprising a through opening for passive a servo write head to a location inside of the hard disk drive.

5. A hard disk drive as defined in claim 1, said at least one dew forming plate comprising more than one dew forming plate.

6. A hard disk drive as defined in claim 1, said at least one dew forming plate being mounted in a respective opening of the cover using an adhesive.

7. A hard disk drive as defined in claim 6, said adhesive having a good thermal conductivity.

8. A method of preventing dew from being formed on internal parts of a hard disk drive having a cover, comprising the steps of:

mounting at least one dew forming plate having a thermal conductivity which is greater than that of the cover of said hard disk drive and a thickness which is thinner than that of the cover onto a respective through opening of the cover of said hard disk drive so as to collect the moisture which would be formed on the internal parts and attaching a permeable sealing label over each of the at least one dew forming plate; and causing dew formed on the inside of the at least one dew forming plate to evaporate through a ventilation opening when the outside environment is changed from a state of a high temperature and high humidity to a state of a low temperature and low humidity.

9. A method as defined in claim 8, the dew being evaporated through a breather filter.

10. An enclosure, having a main body with a cover for protecting its internal parts, comprising: at least one dew forming plate having a thermal conductivity greater than that of the cover, said at least one dew forming plate being mounted in a respective through opening of the cover so as to collect dew which would be formed on said internal parts due to an external environment, and further comprising a permeable sealing label attached over each of said at least one dew forming plate.

11. An enclosure as defined in claim 10, said at least one dew forming plate comprising a copper plate.

12.. An enclosure as defined in claim 10, said at least one dew forming plate having a thickness which is less than that of the cover.

13. An enclosure as defined in claim 10, said at least one dew forming plate comprising more than one dew forming plate.

14. An enclosure as defined in claim 10, said at least one dew forming plate being mounted in a respective opening of the cover using adhesive.

15. An enclosure as defined in claim 14, said adhesive having a good thermal conductivity.

16. A method of preventing dew from being formed on internal parts of an enclosure having a cover, comprising the steps of:

mounting at least one dew forming plate having a thermal conductivity which is greater than that of the cover and a thickness which is thinner than that of the cover onto a respective through opening of the cover of said enclosure so as to collect the moisture which would be formed on the internal parts and attaching a permeable sealing label over each of the at least one dew forming plate; and causing dew formed on the inside of the dew forming plate to evaporate through a ventilation opening when the outside environment is changed from a state of a high temperature and high humidity to a state of a low temperature and low humidity.

17. A method as defined in claim 16 the dew being evaporated through a breathing filter.

* * * * *